United States Patent Office 3,462,431
Patented Aug. 19, 1969

3,462,431
METHOD FOR THE PRODUCTION OF 1,4,5,6-TETRAHYDRO-AS-TRIAZINES
Eugene R. Wagner, Zionsville, Ind., assignor to The Dow Chemical Company, Midland, Mich., a corporation of Delaware
No Drawing. Filed Dec. 5, 1966, Ser. No. 598,940
Int. Cl. C07d 55/10
U.S. Cl. 260—248                    4 Claims

ABSTRACT OF THE DISCLOSURE 1,4,5,6-tetrahydro-as-triazines, such as 1-methyl-3,5-diphenyl - 1,4,5,6 - tetrahydro - as - triazine and 3 - β-dimethylaminoethyl - 1 - methyl - 5 - phenyl - 1,4,5,6-tetrahydro-as-triazine, are prepared by the reaction of a nitrile with a hydrazino alcohol in the presence of sulfuric acid in an improved procedure in which a dispersion of the hydrazino alcohol in an inert organic solvent is added slowly portionwise to a cold mixture of the nitrile and sulfuric acid. The 1,4,5,6-tetrahydro-as-triazine products have pharmacological activity. For example, 1-methyl-5-phenyl - 3 - vinyl - 1,4,5,6 - tetrahydro - as - triazine has analgesic activity as indicated by its antagonism of hydrochloric acid-induced writhing in mice.

The present invention is directed to a new method of preparing substituted 1,4,5,6-tetrahydro-as-triazines and to several new 1,4,5,6-tetrahydro-as-triazines prepared by the new method.

The new compounds of the present invention correspond to the formulae:

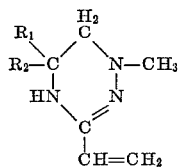

or

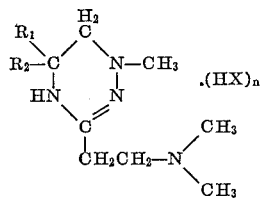

In these and the succeeding formulae set forth in the present specification and claims $R_1$ represents hydrogen or methyl, $R_2$ independently represents hydrogen, methyl or phenyl and when $R_1$ represents hydrogen $R_2$ represents phenyl, X represents chloride or bromide and $n$ represents one of the integers 0 or 1. These 1,4,5,6-tetrahydro-as-triazines, hereinafter referred to as tetrahydro-as-triazines, are liquid or solid materials. The new compounds in the form of their hydrohalide salts are appreciably soluble in water while in the free base form said compounds are soluble in many common organic solvents such as ether, benzene, methylene chloride and chloroform. The new compounds have been found to be pharmacologically active as analgesics and to possess the ability to antagonize the hydrochloric acid-induced writhing response in small animals.

The new process of the present invention is directed to a method for preparing the new compounds of the present invention as well as to the preparation of other pharmacologically useful 1,4,5,6-tetrahydro-as-triazines claimed in a copending application, Ser. No. 598,977 filed even date herewith by Trepanier and Harris. Thus the new process of the present invention is directed to a method for preparing 1,4,5,6-tetrahydro-as-triazines corresponding to the formula

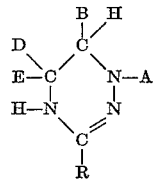

which comprises dissolving a hydrazino alcohol corresponding to the formula

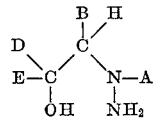

in an inert organic solvent and adding the resulting solvent solution to a cold concentrated sulfuric acid solution containing a nitrile compound corresponding to the formula

RCN

In the above and succeeding formulae of the present specifications and claims, A represents hydrogen or methyl, B independently represents hydrogen or methyl, D independently represents hydrogen or methyl, E represents hydrogen, methyl or phenyl and when D represents hydrogen E represents phenyl, and R represents lower alkyl, phenyl, monofluorophenyl, monochlorophenyl, monobromophenyl, monomethylphenyl, m- or p-nitrophenyl, m- or p-trifluoromethylphenyl, or N,N-dimethylaminoethyl. In the present specification and claims the term "lower alkyl" represents an alkyl moiety containing from 1, to 2, to 3, to 4 carbon atoms such as methyl, ethyl, propyl or butyl. Representative hydrazino alcohols include: N-amino-ephedrine, N-amino-pseudoephedrine, 1-methylhydrazino-t.-butyl alcohol, α-(hydrazinomethyl)-α-methylbenzyl alcohol, α-(1-hydrazinoethyl)-α-methylbenzyl alcohol and α-(1-methylhydrazinomethyl)-benzyl alcohol. Representative R moieties include: 4-chlorophenyl, 3-bromophenyl, 4-bromophenyl, 3-chlorophenyl, 2-chlorophenyl, 2-bromophenyl, 3-methylphenyl, 4-methylphenyl, 2-methylphenyl, 4-fluorophenyl, 3-fluorophenyl and 2-fluorophenyl.

The exothermic reaction of the new method proceeds readily at temperatures of from — 10° C. to 20° C. The reaction is extremely fast and the desired product can be separated from the reaction mixture within minutes after the reactants are contacted intimately. While it is preferred to separate the desired products from the reaction mixture within from 5 to 30 minutes after intimately contacting the reactants, the product can be separated from the reaction mixture at any time up to about 24 hours following the contacting of the reactants without an appreciable decrease in yield.

The reaction proceeds readily when the nitrile and hydrazino alcohol reactants are employed in substantially equimolar proportions and optimum yields are obtained when employing the reactants in such proportions. Molar amounts of hydrazino alcohol constituting a substantially greater than 2-fold excess with respect to the molar quantity of nitrile are undesirable as such excesses result in the production of large amounts of tar with attendant decreases in yield and difficulty in separating the desired tetrahydro-as-triazine product. The desired product is conveniently separated from the reaction mixture as hereinafter set forth.

The 3 - (N,N - dimethylaminoethyl) - 1,4,5,6 - tetrahydro-as-triazine hydrohalide salts corresponding to the formula

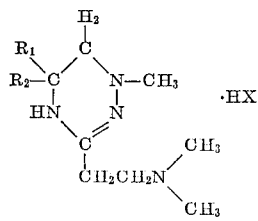

are prepared by known procedures wherein the 3-(N,N-dimethylaminoethyl) - 1,4,5,6 - tetrahydro - as - triazine compound to be converted to the salt is dissolved in ether and the resulting ether solution treated with hydrogen chloride or hydrogen bromide to produce the tetrahydro-as-triazine hydrochloride or hydrobromide salt, respectively. The reaction is carried out at room temperature. During the addition of the hydrogen halide the desired salt product precipitates in the reaction mixture as a crystalline solid which is isolated by a convenient procedure such as filtration or decantation.

In carrying out the new method of the present invention it is critical and essential that a solution of the hydrazino alcohol in an inert organic solvent be added to the solution of the nitrile in sulfuric acid. Representative solvents for the hydrazino alcohol include methylene chloride, chloroform, ether and carbon tetrachloride. The addition of the hydrazino alcohol solution is conveniently carried out slowly and with stirring in order to prevent the exothermic reaction from producing large amounts of heat thereby raising the temperature of the reaction mixture to a point outside of the reaction temperature range. During the contacting of the reactants, the reaction mixture can also be cooled by conventional techniques in order to maintain the temperature of the reaction mixture within the desired temperature range. Following the contacting of the reactants, optimum yields are obtained if the reaction is terminated within from about 5 minutes to about one-half hour. Conveniently, the reaction is terminated by pouring the reaction mixture onto ice or into cold water. The acidic aqueous mixture thus obtained may then be extracted with chloroform or methylene chloride to remove any reaction by-product which may have precipitated in the aqueous mixture. The acidic aqueous mixture is then made basic. In a preferred procedure, the acidic aqueous mixture is poured into a cooled aqueous solution of alkali metal base. Representative alkali metal bases include sodium hydroxide, potassium hydroxide, sodium carbonate and potassium carbonate. The basic aqueous solution is thereafter extracted with an inert organic solvent to remove the tetrahydro-as-triazine product therefrom. Representative solvents include methylene chloride, chloroform, ether or benzene. The solution of the product in the extraction solvent is thereafter washed with water, dried with sodium sulfate and the solvent removed therefrom by such conventional procedures as evaporation or fractional distillation to obtain the crude product as a residue. The product can be obtained in higher purity from this residue by such conventional procedures as fractional crystallization, fractional distillation or extraction with an appropriate solvent.

The following examples are merely illustrative and are not intended to be limiting.

EXAMPLE 1

Acetonitrile (16.6 grams; 0.4 mole) was dissolved in 200 milliliters of concentrated sulfuric acid and the resulting solution stirred and cooled to 10° C. Thereafter, a solution of (1-methylhydrazino)-t-butyl alcohol (23.6 grams; 0.2 mole) in 10 milliliters of methylene chloride was added drop-wise over a 1½ hour period. During the addition of the hydrazino alcohol the temperature of the reaction mixture was maintained at between 10° and 20° C. On completion of the addition, the reaction mixture was poured onto 500 grams of ice and the resulting aqueous mixture neutralized with sodium carbonate. Following the neutralization sodium hydroxide was added to the neutralized mixture to make it more basic (pH about 11). The basic mixture was thereafter extracted 4 times with ether and the combined ether layers were dried over sodium sulfate and concentrated to obtain an oily residue. The oily residue was fractionally distilled to remove the low boiling constituents and obtain a crystalline pot residue. This crystalline residue was thereafter recrystallized from a mixture of petroleum ether and methylene chloride to obtain the 1,3,5-tetramethyl-1,4,5,6-tetrahydro-as-triazine product as a crystalline solid melting at 126.5°–127.5° C.

EXAMPLE 2

N-amino-ephedrine (17 grams; 0.1 mole) is dissolved in 50 milliliters of chloroform. The resulting solution is added slowly drop-wise with stirring over a period of about two hours to a solution of p-trifluoromethylbenzonitrile (18.5 grams; 0.1 mole) dissolved in 300 milliliters of sulfuric acid. During the addition of the hydrazino alcohol solution to the sulfuric acid, the temperature of the reaction mixture is maintained at −5° C. On completion of the addition of the hydrazino alcohol, the reaction mixture is poured onto ice and the resulting aqueous mixture extracted with methylene chloride and the methylene chloride extract discarded. The acidic aqueous mixture is then made basic, pH 11–12, by the addition of sodium hydroxide. The basic aqueous mixture is then extracted three times in succession with methylene chloride. The methylene chloride extraction layers are combined, dried over sodium sulfate and concentrated in vacuo to obtain the 1,6-dimethyl-3-(p-trifluoromethylphenyl) - 5 - phenyl - 1,4,5,6 - tetrahydro - as - triazine product, melting at 119°–120° C., as a solid residue.

The following compounds are prepared by employing the general procedures set forth in the preceding examples.

1,6 - dimethyl - 3 - (p - chlorophenyl) - 5 - phenyl-1,4,5,6-tetrahydro-as-triazine (melting at 132°–133° C.) by reacting together N-amino-ephedrine and p-chlorobenzonitrile.

1,6-dimethyl-3,5-diphenyl-1,4,5,6 - tetrahydro-as-triazine (melting at 146°–147° C.) by reacting together N-amino-ephedrine and benzonitrile.

1,6-dimethyl-3,5-diphenyl-1,4,5,6 - tetrahydro-as-triazine (melting at 146°–147° C.) by reacting together N-amino-pseudoephedrine and benzonitrile.

1,6-dimethyl-3-(o-chlorophenyl)-5 - phenyl - 1,4,5,6-tetrahydro-as-triazine (molecular weight 296.35) by reacting together N-amino-ephedrine and o-chlorobenzonitrile.

1,6-dimethyl-3-(m-tolyl)-5-phenyl - 1,4,5,6-tetrahydro-as-triazine (melting at 147°–148° C.) by reacting N-amino-ephedrine and m-tolunitrile.

1,6-dimethyl-3-(p-tolyl)-5-phenyl - 1,4,5,6-tetrahydro-as-triazine (melting at 142°–143° C.) by reacting together N-amino-ephedrine and p-tolunitrile.

1,6-dimethyl-3-(o-tolyl)-5-phenyl - 1,4,5,6 - tetrahydro-as-triazine (molecular weight 296.35) by reacting together N-amino-ephedrine and o-tolunitrile.

3,5-diphenyl-1-methyl-1,4,5,6 - tetrahydro-as-triazine (melting at 133°–134° C.) by reacting together α-(1-methyl-hydrazinomethyl)benzyl alcohol and benzonitrile.

1,6-dimethyl-3-(3-pyridyl)-5-phenyl - 1,4,5,6 - tetrahydro-as-triazine (melting at 146°–147° C.) by reacting together N-amino-ephedrine and nicotinonitrile.

1,5,5-trimethyl-3-phenyl-1,4,5,6 - tetrahydro-as-triazine (melting at 95°–96° C.) by reacting together benzonitrile and 1-methylhydrazino-t-butyl alcohol.

1-methyl-3-(o-chlorophenyl)-5-phenyl - 1,4,5,6-tetrahydro-as-triazine (melting at 92°–93° C.) by reacting together o-chlorobenzonitrile and α-(1-methylhydrazinomethyl)benzyl alcohol.

1-methyl-3-p-methoxyphenyl)-5 - phenyl - 1,4,5,6-tetrahydro-as-triazine (melting at 103°–104° C.) by reacting together p-methoxybenzonitrile and α - (1 - methyl-hydrazinomethyl)benzyl alcohol.

1-methyl-3-p-trifluoromethylphenyl) - 5 - phenyl-1,4,5,6-tetrahydro-as-triazine (melting at 80°–83° C.) by reacting together p-trifluoromethylbenzonitrile and α-(1-methylhydrazinomethyl)benzyl alcohol.

5-methyl-3,5-diphenyl-1,4,5,6-tetrahydro - as - triazine (molecular weight 252.30) by reacting together benzonitrile and α-(1-methylhydrazinomethyl) - α - methylbenzyl alcohol.

5,6-dimethyl-5-phenyl-3-(4-trifluoromethyl - phenyl)-1,4,5,6-tetrahydro-as-triazine (molecular weight 334.22) by reacting together 4-(trifluoromethyl)benzonitrile and α-(1-hydrazinoethyl)-α-methylbenzyl alcohol.

1-methyl-3-(p-chlorophenyl)-5-phenyl - 1,4,5,6-tetrahydro-as-triazine (melting at 107°–108° C.) by reacting together p-chlorobenzonitrile and α-(1-methylhydrazinomethyl)benzyl alcohol.

1,6-dimethyl-3-(p-fluorophenyl)-5-phenyl - 1,4,5,6-tetrahydro-as-triazine (melting at 118°–121° C.) by reacting together N-amino-ephedrine and p-fluorobenzonitrile.

1,6-dimethyl-3-(p-nitrophenyl)-5-phenyl - 1,4,5,6-tetrahydro-as-triazine (melting at 110°–111° C.) by reacting together N-amino-ephedrine and 4-nitrobenzonitrile.

1-methyl-3-(N,N-dimethylaminoethyl) - 5 - phenyl-1,4,5,6-tetrahydro-as-triazine (boiling at 143° C. under a pressure equivalent to 0.24 millimeters of mercury) by reacting together 3-dimethylaminopropionitrile and α-(methylhydrazinomethyl)benzyl alcohol.

1,5,5 - trimethyl-3-(N,N-dimethylaminoethyl) - 1,4,5,6-tetrahydro-as-triazine (molecular weight 172.28) by reacting together 1-methylhydrazino-t.-butyl alcohol and 3-dimethylaminopropionitrile.

The tetrahydro-as-triazine compounds of the present invention corresponding to the formula

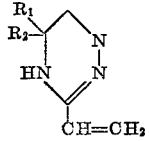

are prepared by the thermal elimination of dimethylamine from 3-β-dimethylaminoethyl-1-methyl - 5 - substituted-1,4,5,6-tetrahydro-as-triazine corresponding to the formula

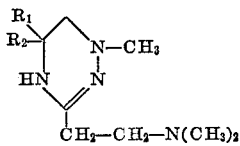

The thermal decomposition is most conveniently accomplished by fractionally distilling the 1-methyl-3-(N,N-dimethylaminoethyl)-5-substituted - 1,4,5,6 - tetrahydro-as-thiazine. The desired 1-methyl-5-substituted-3-vinyl-1,4,5,6-tetrahydro-as-triazine product is then collected as a distillation fraction. In a convenient procedure, the thermal decomposition of the 1-methyl-3-(N,N-dimethylaminoethyl-5-substituted-1,4,5,6-tetrahydro-as-triazine is carried out in situ with the 1-methyl-3-(N,N-dimethylaminoethyl)-5-substituted-1,4,5,6-tetrahydro - as - triazine being produced in accordance with the method of the present invention.

EXAMPLE 3

3-dimethylaminopropionitrile was added drop-wise to 200 milliliters of concentrated sulfuric acid. During the addition of the nitrile the temperature of the sulfuric acid solution was maintained at between 10° and 15° C.

Thereafter, the sulfuric acid-nitrile solution was cooled to a temperature of about 10° C. whereupon a solution of α-(1 - methylhydrazinomethyl)benzyl alcohol (33.2 grams; 0.2 mole) in 15 milliliters of methylene chloride was added slowly drop-wise. The resulting mixture was then poured onto ice and the aqueous mixture thereafter neutralized with excess sodium carbonate. Thereafter, potassium hydroxide was added to increase the basicity of the neutralized solution. The basic solution was then extracted 3 times with a methylene chloride-ether (1:1) mixture. A brown oil which appeared at the lower edge of the organic phases during the extraction procedure was kept with the organic layer. The aqueous layer was thereafter extracted with methylene chloride and then with ether, and the combined organic layers dried over sodium sulfate, filtered and concentrated. The concentrate was distilled to obtain the 1-methyl-5-phenyl-3-vinyl-1,4,5,6-tetrahydro-as-triazine product boiling at 146° C. at 1.5 millimeters of mercury. The product was found to have a nuclear magnetic resonance spectrum that is typical of a vinyl moiety, confirming the thermal elimination of dimethylamine. Elemental analysis of the product found carbon, hydrogen and nitrogen contents of 71.24, 7.83 and 20.68 percent, respectively, as compared with the theoretical contents of 71.61, 7.51 and 20.89 percent, respectively.

In a similar procedure 1,5,5-trimethyl-3-vinyl-1,4,5,6-tetrahydro-as-triazine (molecular weight 183.20) is produced by heating 1,5,5-trimethyl-3-(N,N-dimethylaminoethyl)-1,4,5,6-tetrahydro-as-triazine.

The new compounds of the present invention possess pharmacological activity and have analgesic properties as illustrated by their ability to antagonize the hydrochloric acid induced writhing response. In representative procedures 1 - methyl-5-phenyl-3-vinyl - 1,4,5,6-tetrahydro-astriazine and 1-methyl-3-(N,N-dimethylaminoethyl) - 5-phenyl-1,4,5,6-tetrahydro-as-triazine each when injected intraperitoneally at a concentration of 100 milligrams protected mice against writhing induced by the intraperitoneal injection of hydrochloric acid (10 mg./kg. of 0.1 percent HCl). The hydrochloric acid was injected 30 minutes after the 1,4,5,6-tetrahydro-as-triazine was injected.

What is claimed is:

1. In the method of producing 1,4,5,6-tetrahydro-astriazines corresponding to the formula

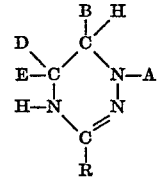

which comprises reacting a substituted β-(1-methylhydrazine) alcohol corresponding to the formula

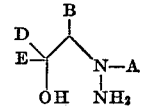

with a nitrile corresponding to the formula

in the presence of sulfuric acid, the improvement which comprises (1) dispersing the β-(1-methylhydrazino) alcohol in an inert organic solvent and (2) adding said dispersion slowly, portionwise to a mixture of cold sulfuric acid and a nitrile corresponding to the formula

in which Formulae R represents a member of the group consisting of phenyl, monochlorophenyl, monobromophenyl, monomethylphenyl, pyridyl, monofluorophenyl, m- and p-nitrophenyl, m- and p-trifluoromethylphenyl and N,N-dimethylaminoethyl, A represents hydrogen or methyl, B independently represents hydrogen or methyl, D independently represents hydrogen or methyl, E represents hydrogen, methyl or phenyl, and when D represents hydrogen E represents phenyl.

2. A compound selected from the group of 1,4,5,6-tetrahydro-as-triazines corresponding to the formulas

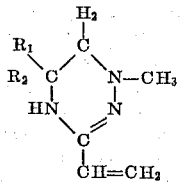

or

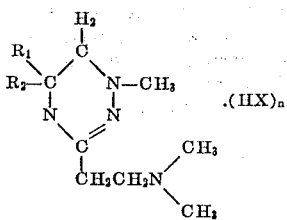

wherein $R_1$ represents hydrogen or methyl, $R_2$ independently represents hydrogen, methyl or phenyl, when $R_1$ represents hydrogen $R_2$ represents phenyl, X represents chloride or bromide and $n$ represents one of the integers 0 or 1.

3. The compound in claim 2 wherein the 1,4,5,6-tetrahydro - as - triazine is 1-methyl-5-phenyl-3-vinyl-1,4,5,6-tetrahydro-as-triazine.

4. The compound claimed in claim 2 wherein the 1,4,5,6-tetrahydro-as-triazine is 1-methyl - 3 - (N,N-dimethylaminoethyl)-5-phenyl-1,4,5,6-tetrahydro-as-triazine.

References Cited

UNITED STATES PATENTS 3,021,328    2/1962    Morin et al. _____ 260—248
3,135,737    6/1964    Restivo _____ 260—248 XR

OTHER REFERENCES

Trepanier et al., J. Medicinal Chem., vol. 9, pp. 881–5 (1966).

HENRY R. JILES, Primary Examiner

J. M. FORD, Assistant Examiner

U.S. Cl. X.R.

260—999